US012690520B2

(12) United States Patent (10) Patent No.: US 12,690,520 B2
Roberge et al. (45) Date of Patent: Jul. 28, 2026

(54) MOBILE HARVESTING SYSTEM AND METHOD

(71) Applicant: ATELIER D'USINAGE JULES ROBERGE INC., St-Pierre-de-l'Île-d'Orléans (CA)

(72) Inventors: Jules Roberge, Saint-Pierre-de-l'Île-d'Orléan (CA); Mathieu Roberge, Saint-Pierre-de-l'Île-d'Orléan (CA); Jonathan Sourd, Saint-Pierre-de-l'Île-d'Orléan (CA); Philippe Richer, Saint-Pierre-de-l'Île-d'Orléan (CA)

(73) Assignee: ATELIER D'USINAGE JULES ROBERGE INC., St-Pierre-de-l'Île-d'Orléans (CA)

( * ) Notice: Subject to any disclaimer, the term of this patent is extended or adjusted under 35 U.S.C. 154(b) by 394 days.

(21) Appl. No.: 18/339,309

(22) Filed: Jun. 22, 2023

(65) Prior Publication Data

US 2023/0413729 A1 Dec. 28, 2023

Related U.S. Application Data

(60) Provisional application No. 63/354,314, filed on Jun. 22, 2022.

(30) Foreign Application Priority Data

May 31, 2023 (CA) ...................................... 3201362

(51) Int. Cl.
*A01D 46/00* (2006.01)
*A01B 75/00* (2006.01)
(Continued)

(52) U.S. Cl.
CPC .............. *A01D 46/00* (2013.01); *A01B 75/00* (2013.01); *A01D 45/001* (2013.01); *A01D 46/243* (2013.01)

(58) Field of Classification Search
CPC ........ A01D 45/00–45/30; A01D 46/00–46/30; A01B 75/00
See application file for complete search history.

(56) References Cited

U.S. PATENT DOCUMENTS 2,524,181 A * 10/1950 Sivertson ............. A01D 45/001
414/508
2,948,543 A * 8/1960 Collier ................... A01B 39/14
172/26
(Continued)

FOREIGN PATENT DOCUMENTS

DE 1946000 A1 * 4/1971
DE 20102216 U1 * 6/2002 ........... A01D 45/007
(Continued)

*Primary Examiner* — Joseph M Rocca
*Assistant Examiner* — Madeline I Runco
(74) *Attorney, Agent, or Firm* — Alexandre Daoust; Norton rose fulbright Canada LLP

(57) ABSTRACT

A mobile harvesting system is towable longitudinally by a vehicle along a field. The mobile harvesting system includes a trailer frame having wheels and a tongue configured for coupling to the vehicle. A harvesting frame is elongated and pivotally mounted to the trailer frame for pivoting between a longitudinal orientation and a transversal orientation. The harvesting frame has a plurality of sleigh attachments distributed along its length. A plurality of harvester sleighs are each coupled to a corresponding one of the sleigh attachments at a corresponding transversal position relative to the trailer frame. Each harvester sleigh has a first runner transversally spaced apart from a second runner, the first runner and the second runner both being longitudinally oriented and structurally interconnected by a sleigh frame.

14 Claims, 11 Drawing Sheets

(51) Int. Cl.
   *A01D 45/00*       (2018.01)
   *A01D 46/24*       (2006.01)

(56)          References Cited

U.S. PATENT DOCUMENTS

| | | | | | |
|---|---|---|---|---|---|
| 3,223,444 | A | * | 12/1965 | Tart | A01D 45/16 |
| | | | | | 296/5 |
| 3,305,113 | A | * | 2/1967 | Gardner | A01D 46/243 |
| | | | | | 414/508 |
| 3,351,151 | A | * | 11/1967 | Miller, Jr. | A01B 75/00 |
| | | | | | 280/43.23 |
| 3,589,744 | A | * | 6/1971 | Hansen | A01B 75/00 |
| | | | | | 180/209 |
| 4,172,352 | A | * | 10/1979 | McCarthy | A01D 46/28 |
| | | | | | 56/DIG. 15 |
| 4,616,468 | A | * | 10/1986 | Munoz | A01D 67/00 |
| | | | | | 53/391 |
| 4,976,094 | A | * | 12/1990 | Williamson | A01D 46/28 |
| | | | | | 198/313 |
| 5,218,812 | A | * | 6/1993 | Ventura | B65B 25/046 |
| | | | | | 53/448 |
| 5,454,444 | A | * | 10/1995 | Taylor | A01M 7/0014 |
| | | | | | 180/321 |
| 6,758,317 | B1 | * | 7/2004 | Colby | A01D 46/243 |
| | | | | | 414/508 |
| 8,689,527 | B2 | * | 4/2014 | Johnson | A01D 46/00 |
| | | | | | 414/508 |
| 11,382,269 | B2 | * | 7/2022 | Scott | A01F 29/10 |
| 2006/0127207 | A1 | * | 6/2006 | Corbett | A01D 45/001 |
| | | | | | 414/508 |
| 2009/0302561 | A1 | * | 12/2009 | Pinet | B62M 27/02 |
| | | | | | 280/28.16 |
| 2011/0099965 | A1 | * | 5/2011 | Dorn | A01B 75/00 |
| | | | | | 414/813 |
| 2015/0173296 | A1 | * | 6/2015 | Wafler | A01D 46/243 |
| | | | | | 182/129 |

FOREIGN PATENT DOCUMENTS

| | | | | | |
|---|---|---|---|---|---|
| DE | 202009012082 | U1 | * | 1/2010 | A01D 46/243 |
| DE | 102021113162 | A1 | * | 11/2022 | A01B 75/00 |
| FR | 2862478 | A1 | * | 5/2005 | A01D 46/243 |
| IT | 201700031501 | A1 | * | 9/2018 | A01C 11/02 |

* cited by examiner

MOBILE HARVESTING SYSTEM AND METHOD

TECHNICAL FIELD

This disclosure generally relates to the field of harvesting.

BACKGROUND

Low bush crops, such as strawberries and blueberries, are typically arranged in transversally spaced apart rows in a field. Such low bush crops typically must be harvested manually due to the delicate nature of the crops. This may be time consuming, as each row must be harvested individually. Therefore, improvements are sought.

SUMMARY

In accordance with one aspect, there is provided a mobile harvesting system, the mobile harvesting device towable longitudinally by a vehicle along a field, comprising: a trailer frame having wheels and a tongue configured for coupling to the vehicle; a harvesting frame being elongated and pivotally mounted to the trailer frame for pivoting between a longitudinal orientation and a transversal orientation, the harvesting frame having a plurality of sleigh attachments distributed along its length; and a plurality of harvester sleighs, each harvester sleigh coupled to a corresponding one of the sleigh attachments at a corresponding transversal position relative to the trailer frame, each harvester sleigh having a first runner transversally spaced apart from a second runner, the first runner and the second runner both being longitudinally oriented and structurally interconnected by a sleigh frame.

In accordance with another aspect, there is provided a method of harvesting a field of low bush crops, the method comprising: a plurality of harvester persons harvesting corresponding, transversally spaced apart rows of low bush crops, while being supported by runners of at least one harvester sleigh, the runners being longitudinally oriented and positioned in corresponding transversally interspaced spaces between the rows of low bush crops; subsequently to said plurality of harvester persons harvesting, operating a vehicle to pull the at least one harvester sleigh longitudinally while the plurality of harvester persons remain supported by the runners; and subsequently to said operating the vehicle, the plurality of harvester persons harvesting other rows of low bush crops.

In accordance with another aspect, there is provided a mobile harvesting device, the mobile harvesting device towable longitudinally by a vehicle along a field, comprising: a frame extending longitudinally and having a coupler configured for coupling to the vehicle; a first runner transversally spaced apart from a second runner, the first runner and the second runner both being longitudinally oriented and structurally interconnected to the frame; and a harvesting rack supported by the frame.

Many further features and combinations thereof concerning the present improvements will appear to those skilled in the art following a reading of the instant disclosure.

DETAILED DESCRIPTION

Figure 1:
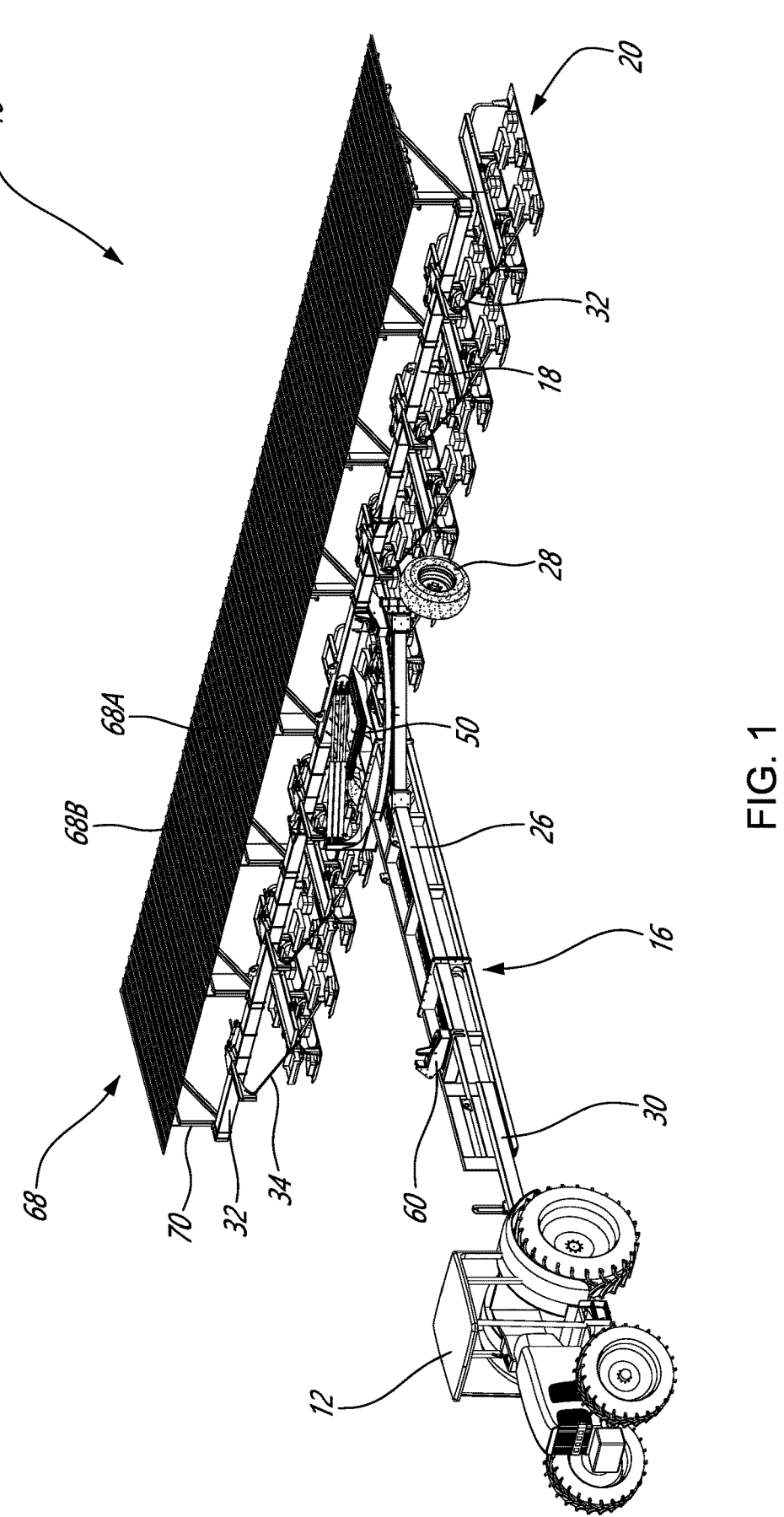
FIG. 1 is a perspective view of a mobile harvesting system in according with an embodiment of the present disclosure.
Figure 2:
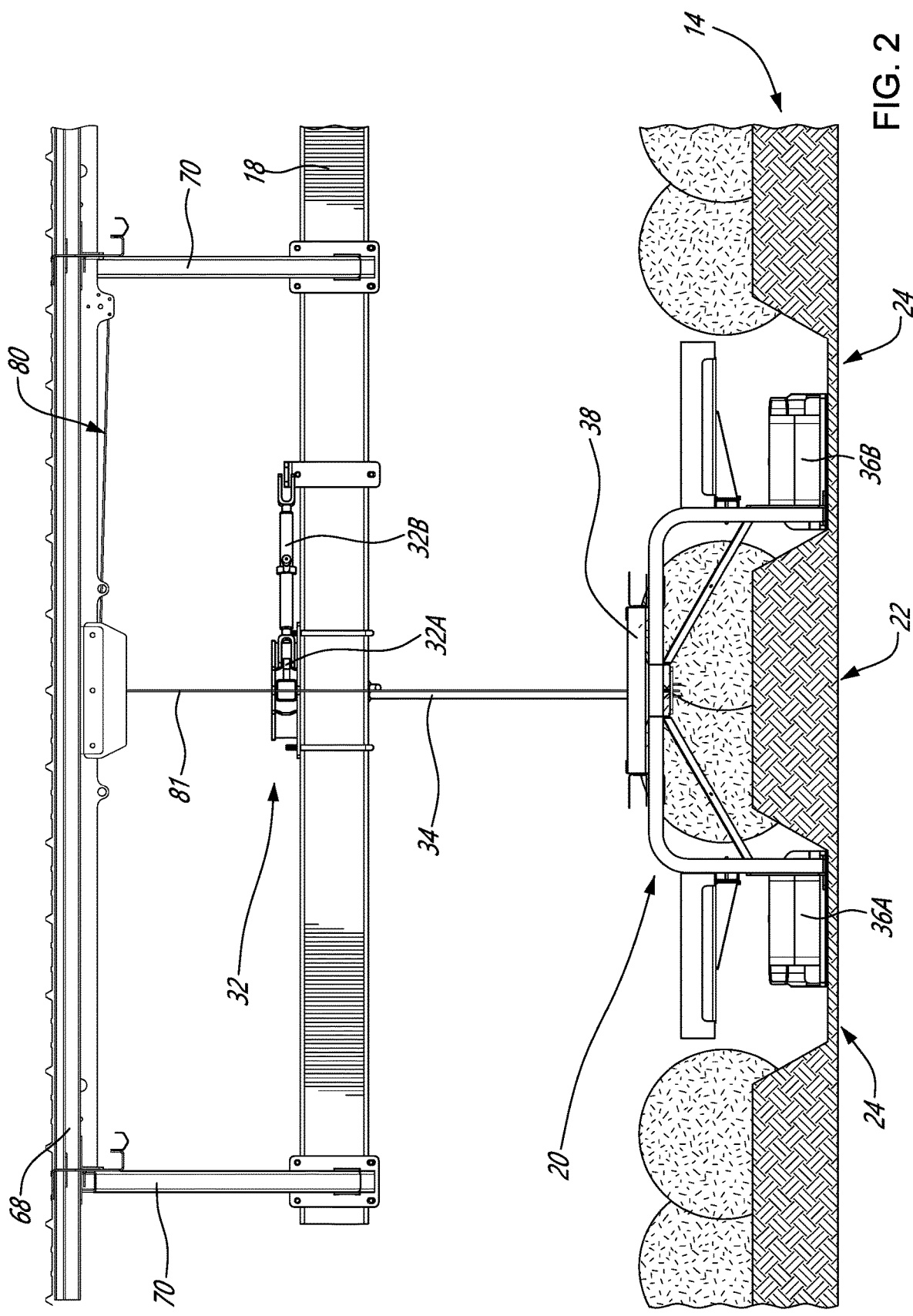
FIG. 2 is an enhanced rear view of the mobile harvesting system of FIG. 1.

Referring to FIGS. 1 and 2, there shown an exemplary mobile harvesting system 10 in accordance with an embodiment of the present disclosure. As will be discussed in further detail below, the mobile harvesting system 10 is towable longitudinally by a vehicle 12 along a field 14 having crops to be harvested. In the shown case, the vehicle 12 is a tractor and the field 14 is a field of low bush crops, although other vehicles (such as a passenger vehicle or pickup truck) and/or field types may be contemplated. In some cases, the vehicle 12 is configured for driving at speeds between about 0.2 and 0.4 km/h during a crop harvesting process, although other speeds may be contemplated. In some cases, the low bush crops may include strawberries, blueberries, or other fruits. Some grain or vegetable crops may be contemplated as well. The depicted mobile harvesting system 10 includes a trailer frame 16 and a harvesting frame 18 pivotally mounted to the trailer frame 16, and a plurality of harvester sleighs 20 removably coupled to the harvesting frame 18. As shown in FIG. 2, the field 14 includes a plurality of transversally spaced apart rows 22 of crops, with transversally interspaced spaces 24 between adjacent rows 22 of crops. The mobile harvesting system 10 is therefore configured for being longitudinally towed, for instance by vehicle 12, along the field 14, with each harvester sleigh 20 interspaced along a transversally arranged harvesting frame 18. As such, harvesting persons positioned on the harvester sleighs 20 can harvest respective rows 22 of crops simultaneously, which may expedite the harvesting of the crops on the field 14. The spacing between adjacent harvester sleighs 20 may therefore be set to correspond with the spacing between adjacent rows 22 of crops. It is understood that the mobile harvesting system 10 may be configured for harvesting crops on a variety of slope types, such as flat and/or hilly terrain.

The trailer frame 16 includes a plurality of trailer frame members 26, wheels 28 and a tongue 30 configured for coupling the trailer frame 16 to the vehicle 12. In some embodiments, the tongue 30 may be retractable within a hollow trailer frame member. The wheels 28 may be interconnected by an axle (not shown) spanning a width of the trailer frame 16 and are configured for allowing the trailer frame 16 to be towed by the vehicle 12. In other cases (see FIG. 9), a steering system may be provided for the wheels 28. While the trailer frame 16 is shown in FIG. 1 to include two wheels 28, it is understood that other numbers of wheels 28 may be included. For example, in an embodiment, the trailer frame 16 may include four wheels 28 arranged in a double-axle configuration.

Figure 4A:
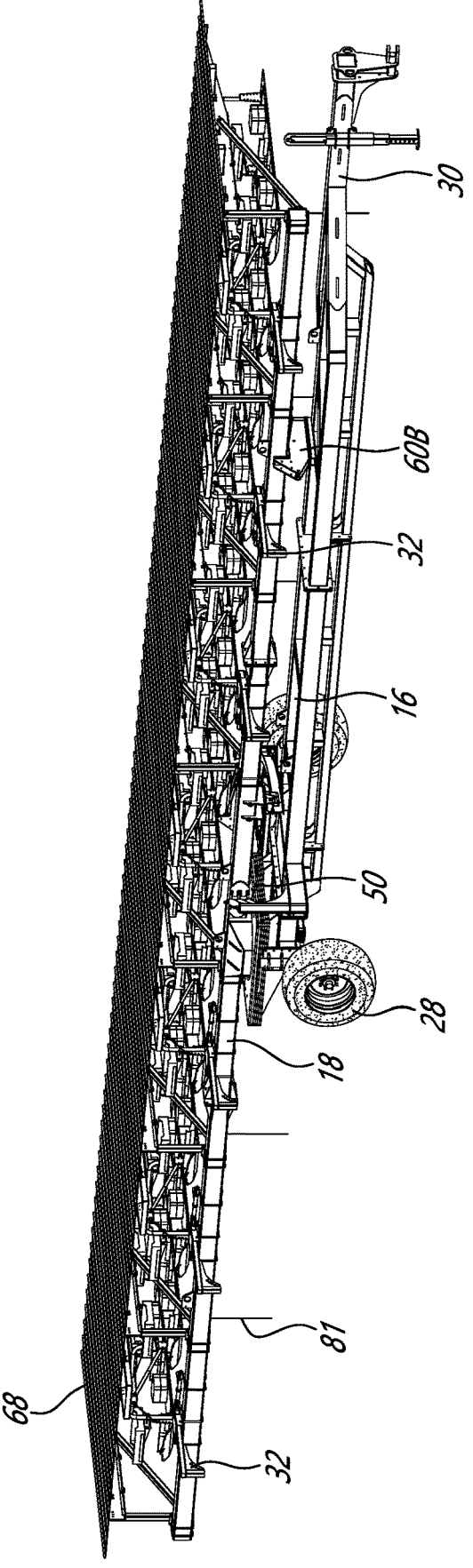
FIGS. 4A-4B are perspective and enhanced side views, respectively, of the mobile harvesting system of FIG. 1 with a harvesting frame in a longitudinal orientation.
Figure 4B:
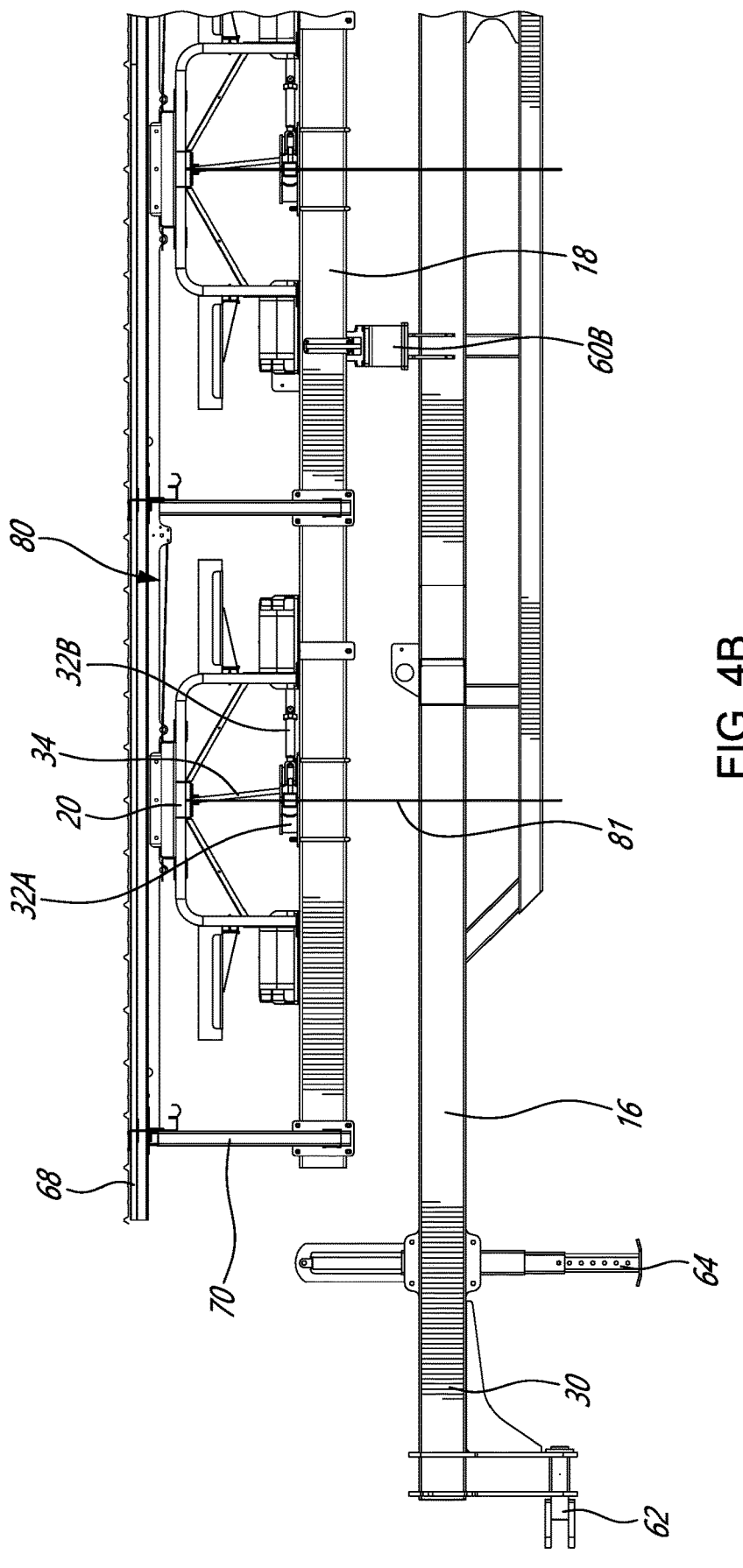

The harvesting frame 18 is elongated and is pivotally mounted to the trailer frame 16 for pivoting between a transversal orientation, as shown in FIG. 1, and a longitudinal orientation, as shown in FIG. 4A-4B and as will be discussed in further detail below. Various means for pivotally connected the harvesting frame 18 to the trailer frame 16 may be contemplated, as will be discussed in further detail below. The harvesting frame 18 illustratively includes a plurality of sleigh attachments 32 distributed along its length. Each sleigh attachment 32 is configured for coupling of a harvester sleigh 18. In some cases, the harvester sleighs 18 may be removably coupled to the harvesting frame 18. In the shown case, each sleigh attachment 32 includes an elongate shaft member 32A protruding longitudinally from the harvesting frame 18 in a forward direction (i.e., towards the vehicle 12) and includes an eyelet or other like attachment means at a forward end thereof. Other types of sleigh attachments 32 may be contemplated. A rope, chain or other like attachment means 34 removably joins each sleigh attachment 32 to a corresponding harvester sleigh 20 and is configured for transferring the longitudinal towing force from the vehicle 12 to the harvester sleigh 20.

In the shown case, each elongate shaft member 32A is operatively coupled to the harvesting frame 18 via a mechanical cylinder 32B (also referred to as a mechanical piston), for instance a pneumatic cylinder or hydraulic cylinder. The mechanical cylinders 32B are configured for allowing the lateral position of each harvester sleigh 20 to vary relative to the harvester frame 18, for instance in cases of non-straight or non-uniform rows 22 of crops, or uneven or sloped terrain. In some cases, the mechanical cylinders 32B allow for manual adjustment (for instance, by a harvester person 42 positioned on a harvester sleigh 20) while the mobile harvesting system 10 is in motion. As such, the mechanical cylinder 32B may be configured for selectively varying a lateral position of each of the plurality of harvester sleighs 20 relative to the harvesting frame 18. Additionally or alternatively, the mechanical cylinders 32B may be configured to manually adjust based on changes in terrain.

In the shown case, the mobile harvesting system further includes a lifting system 80 for the harvester sleighs 20, as will be discussed in further detail below, which includes cables 81 supporting and selectively suspending the harvester sleighs 20 from the roof 68. The lifting system 80 may move the harvester sleighs 20 between a lifted or stowed configuration, in which the harvester sleighs 20 are raised above the harvester frame 18, for instance for transport (see FIGS. 4A-4B), and a lowered configuration, in which the harvester sleighs 20 are positioned on the ground for the harvesting of crops or produce. The tension of each cable 81 may be thus be adjusted accordingly via the lifting system 80. For instance, the tension of each cable 81 may be configured to support the weight of each harvester sleigh 20 in the lowered position so that the vehicle 12 is only responsible for towing the weight of the harvesting persons 42 standing on the harvester sleighs 20, if present.

Figure 3:
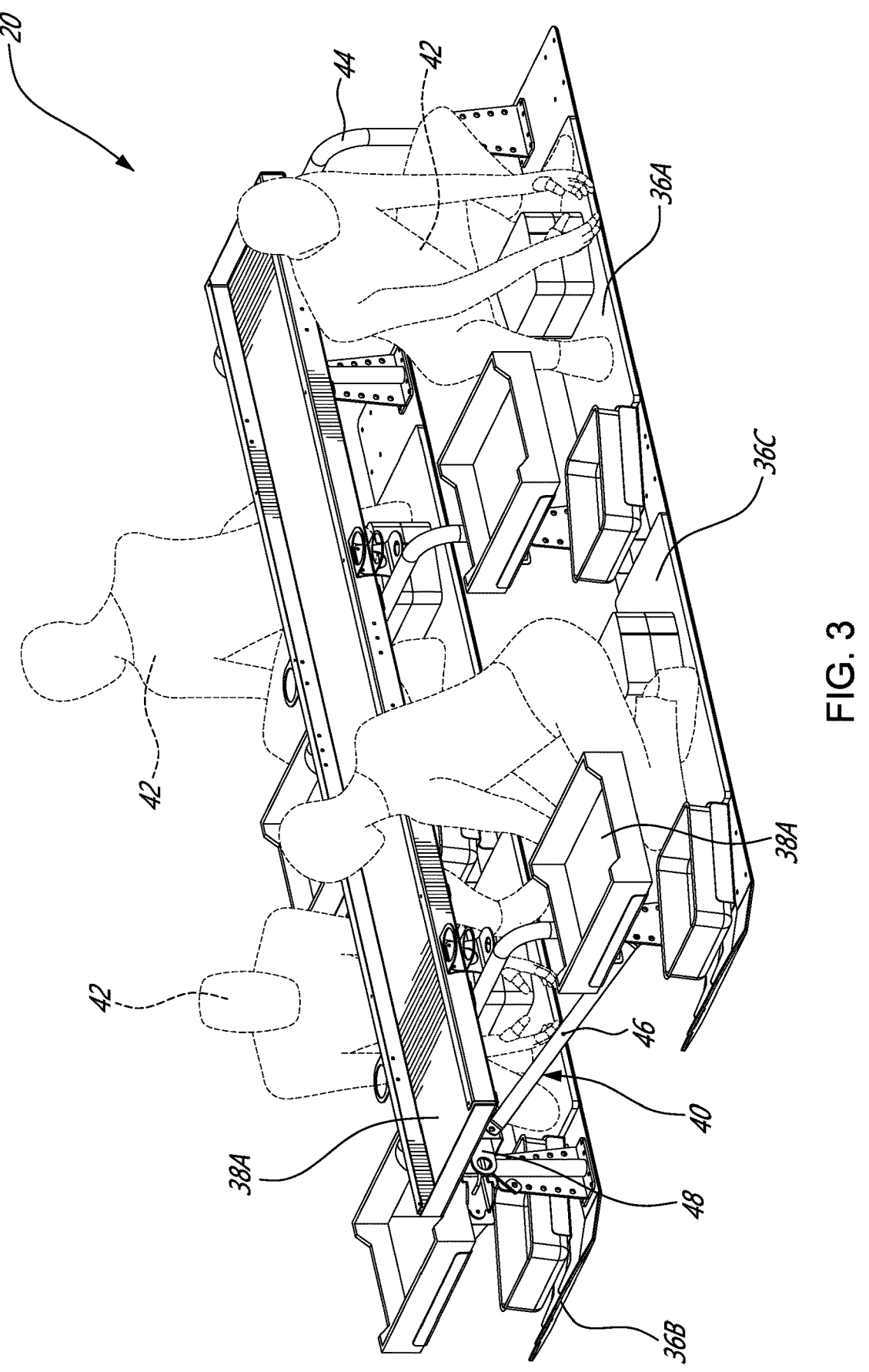
FIG. 3 is a perspective view of a harvester sleigh for the mobile harvesting system of FIG. 1.

Referring to FIG. 3, an exemplary harvester sleigh 20 is shown. The harvester sleigh 20 includes a first runner 36A, a second runner 36B, and a harvesting rack 38 supported by a sleigh frame 40. The first runner 36A is transversally spaced apart from the second runner 36B, and they are both longitudinally oriented and interconnected by the sleigh frame 40. The harvesting rack 38 may be used to temporarily store harvested crops and may support, for instance, a box, basket or other like container 38A. Additional containers 38A may be mountable to upright supports 44 of the harvester sleigh 20. Referring additionally to FIG. 2, each harvesting sleigh 20 is configured to be towed along the field 14 with the harvesting rack 38 positioned in line with and above a row 22 of crops, with the first runner 36A and second runner 36B positioned in corresponding transversally interspaced spaces 24 between the row 22 of crops. One or more harvesting persons 42 (one harvesting person 42 shown in FIG. 3A) may thus be supported on one of the first and second runners 36A, 36B and harvest crops from the row 22 of crops. In some cases, one or more seats may be provided on one or both of the first and second runners 36A, 36B. In the shown case, a plurality of modular seating blocks 36C are placeable on the first and second runners 36A, 36B. The modular seating blocks 36C may be stacked one on top of the other to vary their height, for instance to accommodate different sized harvesting persons 42 and/or seating or kneeling positions, and may be placed at various locations along the lengths of the first and second runners 36A, 36B, for instance to accommodate different numbers of harvesting persons 42. The number of seats may vary, for instance based on the size of the harvesting sleigh 20 and the maximum number of harvesting persons 42 to be accommodated by each harvesting sleigh 20.

The spacing between first and second runners 36A, 36B and the height of the harvesting rack 38 may vary based on, for instance, the spacing between rows 22 of crops and the height of each row 22 of crops. In some cases, the spacing between first and second runners 36A, 36B and/or the height of the harvesting rack 38 may be adjustable based on the field 14 and its rows 22 of crops. The first and second runners 36A, 36B, also referred to as sliders or skis, are configured to slide smoothly along the soil in the spaces 24 between rows 22 of crops. The shown sleigh frame 40 includes upright supports 44 supporting the harvesting rack 38 and a cross beam 46 with a sleigh coupler 48. The chain 34, cable 81 or other attachment means may connect with the sleigh coupler 48, for instance one or more eyelets, to couple the harvester sleigh 20 to the harvesting frame 18. In the shown case, the chain 34 may connect to the harvester sleigh 20 at the sleigh coupler 48 at the front end of the harvester sleigh 20, while the cable 81 may connect to the harvester sleigh 20 at another attachment point towards a middle of the harvester sleigh 20, for instance to balance the harvester sleigh 20 while being raised or lowered.

In some cases, the upright supports 44 may be pivotally coupled to the first and second runners 36A, 36B, allowing the harvesting rack 38 to pivot from an upright position, as shown in FIG. 3, to a lowered position. Locking means, for instance a pin (not shown), may be provided to prevent unwanted movement between said positions. In the upright position, the harvesting rack 38 is disposed above the first and second runners 36A, 36B. In this position, the harvester sleigh may be used for harvesting. In the lowered position, the harvesting rack 38 may be disposed alongside the first and second runners 36A, 36B, i.e., at a substantially similar height as the first and second runners 36A, 36B. With the harvesting sleighs 20 in their lowered position and optionally removable from the harvesting frame 18, the harvester sleigh 20 may be easily transported to and from the field 14. For instance, a plurality of harvester sleighs 20 in their lowered configurations may be stacked one on top of another and transported to and from the field separately from the mobile harvesting system 10. For example, the harvester sleighs may loaded into a storage compartment (for instance, a trailer) towed by an additional vehicle (not shown) for transport to and from the field 14. In some cases, the vehicle 12 may include additional storage for transporting the harvester sleighs 20. For example, the vehicle 12 may be a pickup truck (not shown) configured to simultaneously tow the mobile harvesting system 10 via a rear-mounted hitch and transport the harvester sleighs 20 in its pickup bed. Alternatively, for instance in the shown case (and as depicted in FIGS. 4A-4B), each harvester sleigh 20 may fixedly disposed in a non-pivotable arrangement, and vertically displaceable via cables 81 to a stowed configuration above the harvesting frame 18.

Referring to FIGS. 4A-4B, the harvesting frame 18 is shown in a longitudinal orientation. Stated differently, the harvesting frame 18 is substantially parallel to the trailer frame 16 and to the direction of travel of the vehicle 12 (see FIG. 1). To switch from the transversal orientation to the longitudinal orientation, the harvesting frame 18 is pivoted relative to the trailer frame 16, as will be discussed in further detail below. In the shown case, the harvester sleighs 20 are vertically displaceable above the harvesting frame 18 via cables 81 to a stowed configuration, allowing the harvesting frame 18 to pivot unencumbered relative to the trailer frame 16. In other cases, the harvester sleighs 20 may be uncoupled (i.e., removed) from the harvesting frame 18 prior to pivoting the harvesting frame 18 to its longitudinal orientation. With the harvesting frame 18 in its longitudinal orientation, the mobile harvesting system 10 may be more conducive to be transported to and from the field 14 do to its more compact transversal profile (i.e., width). For instance, with the harvesting frame 18 in its longitudinal orientation, the mobile harvesting system 10 may have a transversal profile suitable for being transported on public roads, for instance to and from a field 14.

In an exemplary embodiment, the mobile harvesting system 10 may be towed by the vehicle 12 to the field 14 with the harvesting frame 18 in its longitudinal configuration, with the harvester sleighs 20 disposed above the harvesting frame 18 in their stowed or retracted configuration (as depicted in FIGS. 4A-4B). Once at the field 14, the harvesting frame 18 may be pivoted into its transversal configuration, and the harvester sleighs 20 may be lowered to their descended or active configuration (as shown in FIGS. 1 and 2) and aligned with rows 22 of crops to be harvested. Once harvesting is complete, the harvester sleighs 20 may be raised once again via cables 81 to their stowed configuration, and the harvesting frame 18 may be pivoted back to its longitudinal configuration to prepare for transport away from the field 14. In other cases, the harvesting frame 18 may be fixedly, i.e., non-pivotally, mounted to the trailer frame 16. In such cases, the harvesting frame 18 may permanently be in its transversal configuration. For example, such a non-pivoting harvesting frame 18 may be suitable for a mobile harvesting system 10 that is stored at or nearby the field 14.

Figure 5:
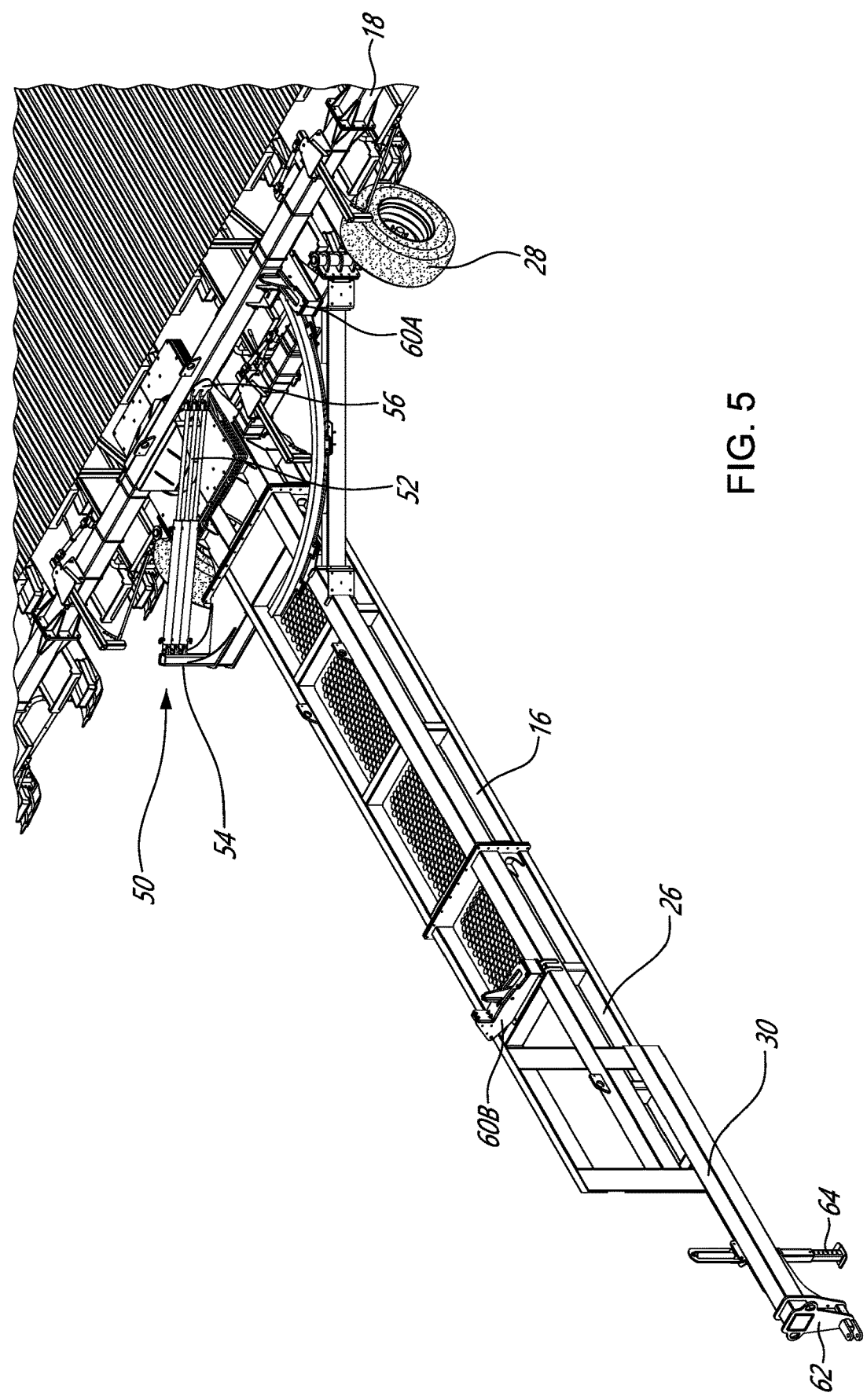
FIG. 5 is an enhanced perspective view of the mobile harvesting system of FIG. 1 with a harvesting frame in a transversal orientation.

Referring to FIG. 5, an exemplary pivoting device 50 is shown for pivoting the harvesting frame 18 between its transversal orientation (see FIGS. 1 and 5) and its longitudinal orientation (see FIG. 4A-4B). In the shown case, pivoting device 50 includes one or more (illustratively three) mechanical cylinders 52 (for instance pneumatic or hydraulic cylinders or pistons) operatively coupling the trailer frame 16 to the harvesting frame 18, illustratively via brackets 54, 56. An actuating device, for instance an electric motor (not shown), may be provided for engaging the mechanical cylinders 52. The mechanical cylinders 52 are configured for displacing between a retracted configuration corresponding to the harvesting frame's 18 longitudinal orientation (shown in FIGS. 4A-4B) and an extended configuration corresponding to the harvesting frame's 18 transversal orientation (shown in FIGS. 1 and 5). Control means may be provided for activating the actuating device. Alternatively, the actuating device may be omitted, and the harvesting frame 18 may be pivoted, with the assistance of the mechanical cylinders 52, manually. Other pivoting devices 50 may be contemplated. For instance, a motor and gear system may be provided, comprising a gear housing, a drive shaft, an input gear and an output gear housed within the gear housing. The gear housing may be mounted to the trailer frame 16, and the output gear may be structurally linked to the harvesting frame 18. The input gear may be drivable by the drive shaft, for instance by an electric motor, and may drive the output gear by the engagement of their gear teeth. The electric motor may include control means for reversing the direction of rotation (i.e., to pivot the harvesting frame 18 between its transversal and longitudinal orientations). In other cases, the electric motor may be omitted, and the pivoting of the harvesting frame 18 may be done manually, with such pivoting metered by the gears. The dimensions of the gears (e.g., diameter, number of teeth) may vary, for instance based on the span and weight of the harvester sleigh 20.

Still referring to FIG. 5, the trailer frame 16 may include a plurality of holders 60 for the harvesting frame 18 in its various positions. In the shown case, two such holders 60 are provided: a first holder 60A for retaining the harvesting frame 18 in its transversal orientation, and a second holder 60B for retaining the harvesting frame 18 in its longitudinal orientation. In other cases, additional holders 60 may be provided, for instance to provide additional rigidity to the harvesting frame 18 in its different positions. Holders 60 may include clamps, straps and/or other retaining means for retaining the harvesting frame 18 in a given position.

In some cases, the tongue 30 may be retractable in and out of a hollow frame member of the trailer frame 16. As such, an overall length of the mobile harvesting system 10 in the longitudinal direction, and as such a distance between the harvester sleighs 20 and the vehicle 12, may be adjusted. For instance, while harvester persons 42 are on the harvester sleighs 20, it may be desirable to increase the distance between the vehicle 12 and the harvester sleighs for instance to distance the harvester persons 42 from the exhaust fumes generated by the vehicle 12. In addition, when the vehicle 12 has reached an end of the field 14 and must turn in the opposite direction so that additional rows 22 of crops may be harvested, it may be desirable to minimize the length of the tongue 30 to facilitate a turning maneuver. Similarly, the length of the tongue 30 may be extended to its maximum length in order to accommodate the harvesting frame 18 in its longitudinal orientation. Other considerations for varying the length of the tongue may be contemplated. A locking pin above the hollow frame member and insertable into holes in the tongue 30 may be provided for locking the tongue 30 in place at predetermined lengths. Other means for setting a length for the tongue 30 may be contemplated. As shown in FIG. 5, the tongue 30 may further include a coupler 62 at a distal end thereof for coupling to the vehicle 12. For instance, coupler 66 may be configured for latching onto a hitch at the rear of the vehicle 12. Other types of couplers 66 may be contemplated. The tongue may further include a stand 64 for supporting the mobile harvesting system 10 when decoupled from a vehicle 12. In some cases, the stand 64 is adjustable in height and rotatable relative to the tongue 30 for stowage when not in use.

Referring again to FIG. 1, in the shown embodiment, the mobile harvesting system 10 includes a roof 68 disposed above and supported by the harvesting frame 18, illustratively by a plurality of roof support members 70 extending upwardly and diagonally from the harvesting frame 18. While four sets of roof support members 70 are shown, this number may vary, for instance based on the overall width of the roof 68 and its weight. In the shown case, the roof 68 extends tangentially past the harvesting frame 18 in each direction so that it may provide shade to the harvesting persons 42 positioned on each harvester sleigh 20. In some cases, the roof 68 and/or the rood support members 70 may be removable from the harvesting frame 18. The material of the roof 68 may vary, for instance to at least partially block light from passing through. In some cases, the roof 68 may be tilted in various directions, for instance to better provide shade to the harvesting persons 42. Roof 68 may alternatively be provided with shutters. In some cases, the roof 68 may additionally or alternatively act as an umbrella for shielding the harvesting persons 42 from precipitation. In other cases, the roof 68 may be omitted. In the shown case, the roof 68 includes a plurality of solid 68A and transparent 68B panels arranged side-by-side or transversely. The transparent panels 68B, also referred to as skylights, may be operable to allow light to shine through to the harvester sleighs 20 for additional visibility for the harvester persons 42. Alternatively, the transparent panels 68B may be omitted, with empty spaces left between adjacent solid panels 68A. The number and arrangement of solid panels 68A and transparent panels 68B may vary, for instance based on the number of harvester sleighs 20 and spacing between adjacent harvester sleighs 20.

Figure 6:
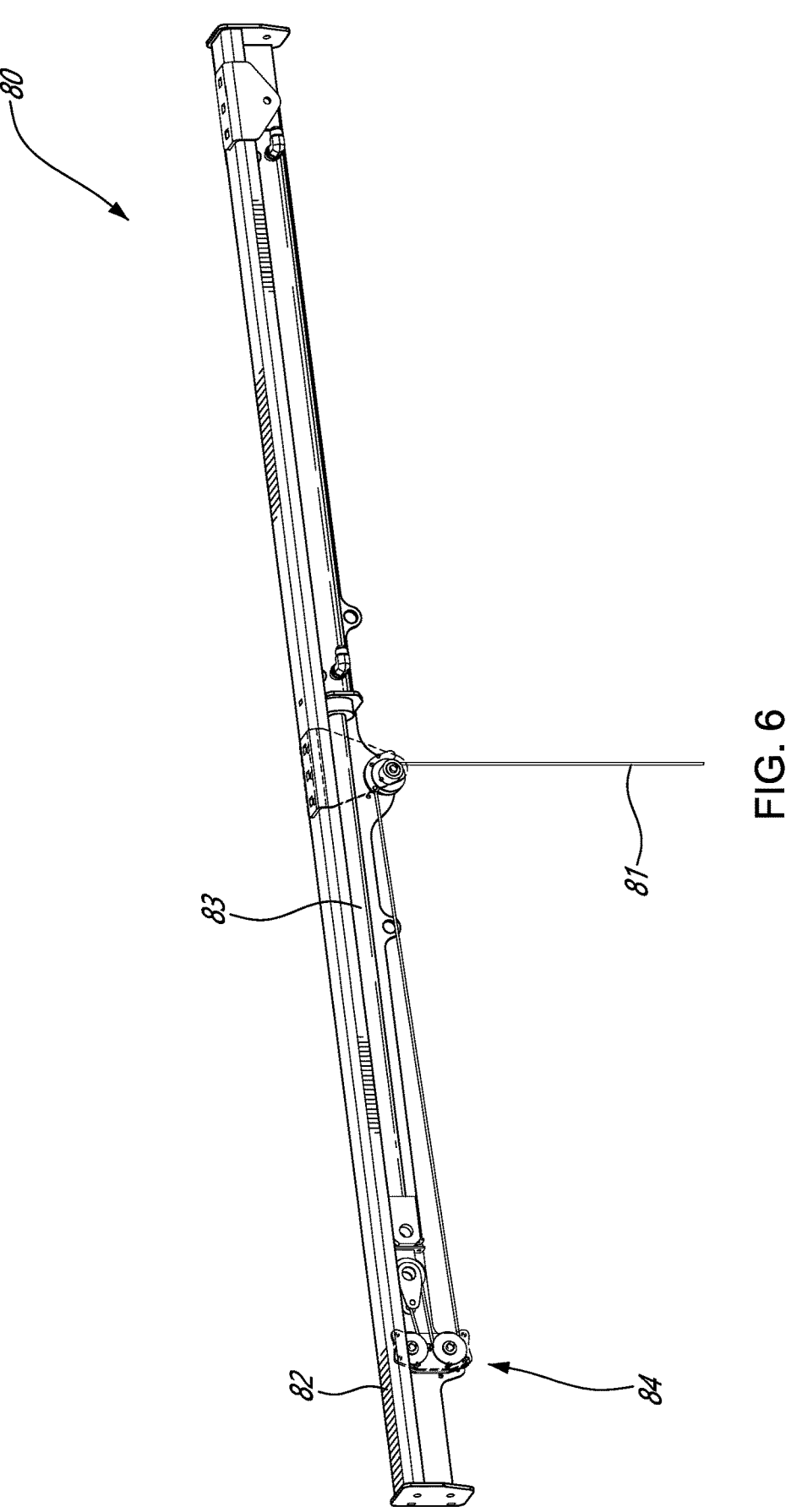
FIG. 6 is an isolated perspective view of a lifting mechanism for the harvester sleighs of the mobile harvesting system of FIG. 1.

Referring to FIG. 6, an exemplary lifting system 80 for the mobile harvesting system 10 is shown. While FIG. 6 shows lifting system 80 in the context of one harvester sleigh 20, it is understood that one or more lifting systems 80 may be provided to provide a lifting function to all harvester sleighs 20 of the mobile harvesting system 10. The depicted lifting system 80 includes a cable 81 operatively coupled to the harvester sleigh 20, a beam 82 (or other like supporting member) operatively coupled to the roof 68 of the mobile harvesting system 10, a mechanical cylinder 83 for effecting vertical displacement of the harvester sleigh 20, and a pulley system 84 for transferring and multiplying the displacement of the mechanical cylinder 83 to the cable 81. A control system (not shown), for instance operated by an operator or automatically controlled by a control logic system, may be provided for controlling the operation of the mechanical cylinder 83. In some cases, the movement of the cable 81 may be multiplied by three relative the movement of the mechanical cylinder 83 via the pulley system 84. Other multiplication factors may be contemplated.

Figure 7:
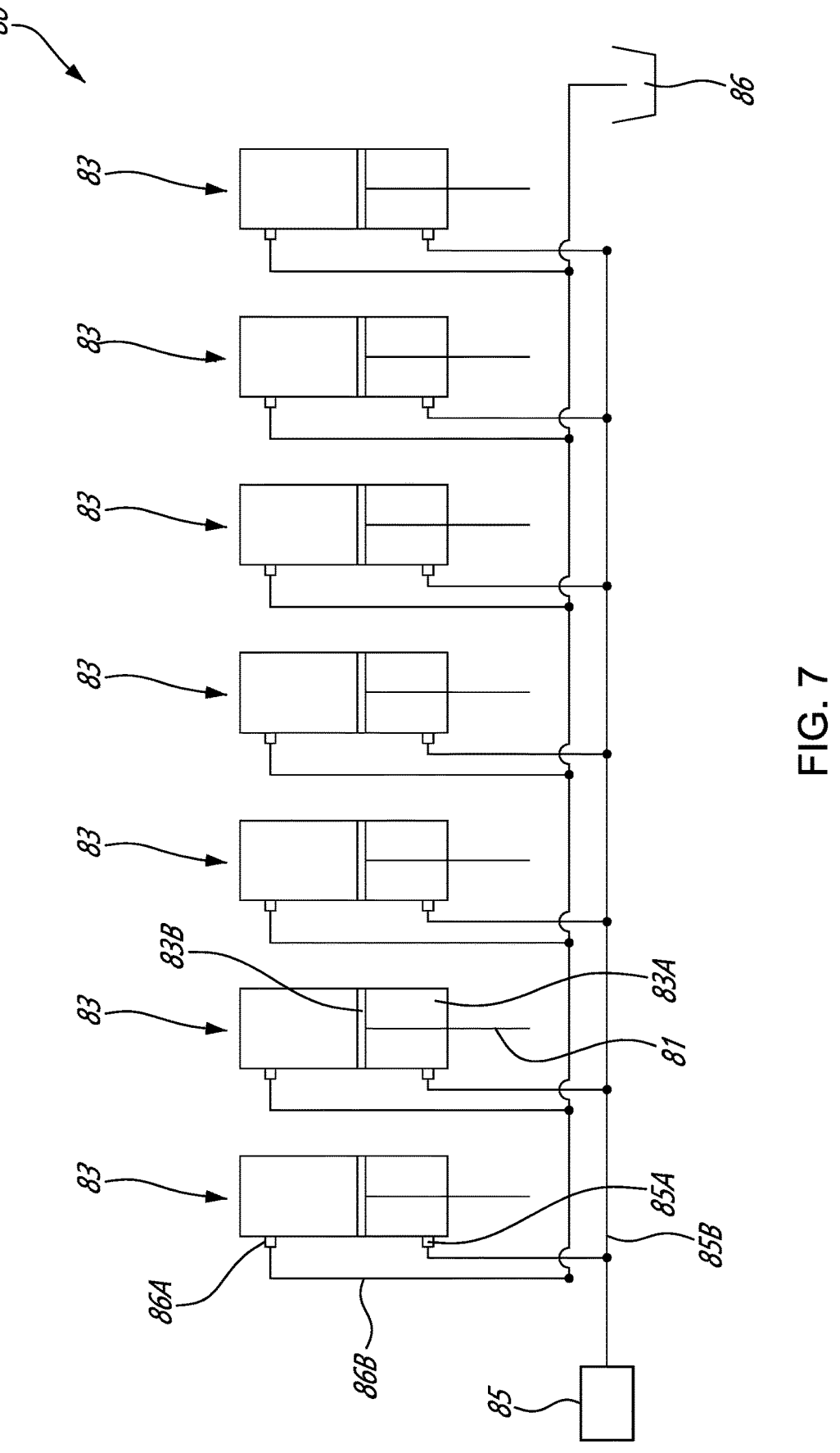
FIG. 7 is an exemplary schematic view of the lifting mechanism of FIG. 6.

Referring to FIG. 7, a schematic of an exemplary lifting system 80, showing a plurality of mechanical cylinders 83, is shown. In the shown case, each mechanical cylinder 83 is a hydraulic cylinder fluidly coupled to a pressurized liquid source 85 (e.g., a pressurized oil source) and a gas source 86 (e.g., a nitrogen source) via liquid inlets 85A, liquid conduits 85B, gas inlets 86A, and gas conduits 86B. Each mechanical cylinder 83 includes a tube 83A and a piston 83B displaceable within the tube 83A based on forces exerted thereon by the gas and liquid. Movement of the pistons 83B is transferred to the cables 81 via pulley system 84 (shown in FIG. 6). A control system (not shown) may control the flow of liquid from the liquid source 85 towards the mechanical cylinders 83, thus varying the pressure inside the mechanical cylinders 83 (i.e., the force exerted by the liquid against the pistons 83B). Varying the flow of the liquid may thus be done to raise, lower, or maintain the harvester sleighs 20 in desired vertical positions. The gas may be provided to counter the force of the liquid against the pistons 83B and avoid vacuum conditions inside the tubes 83A.

Figure 8:
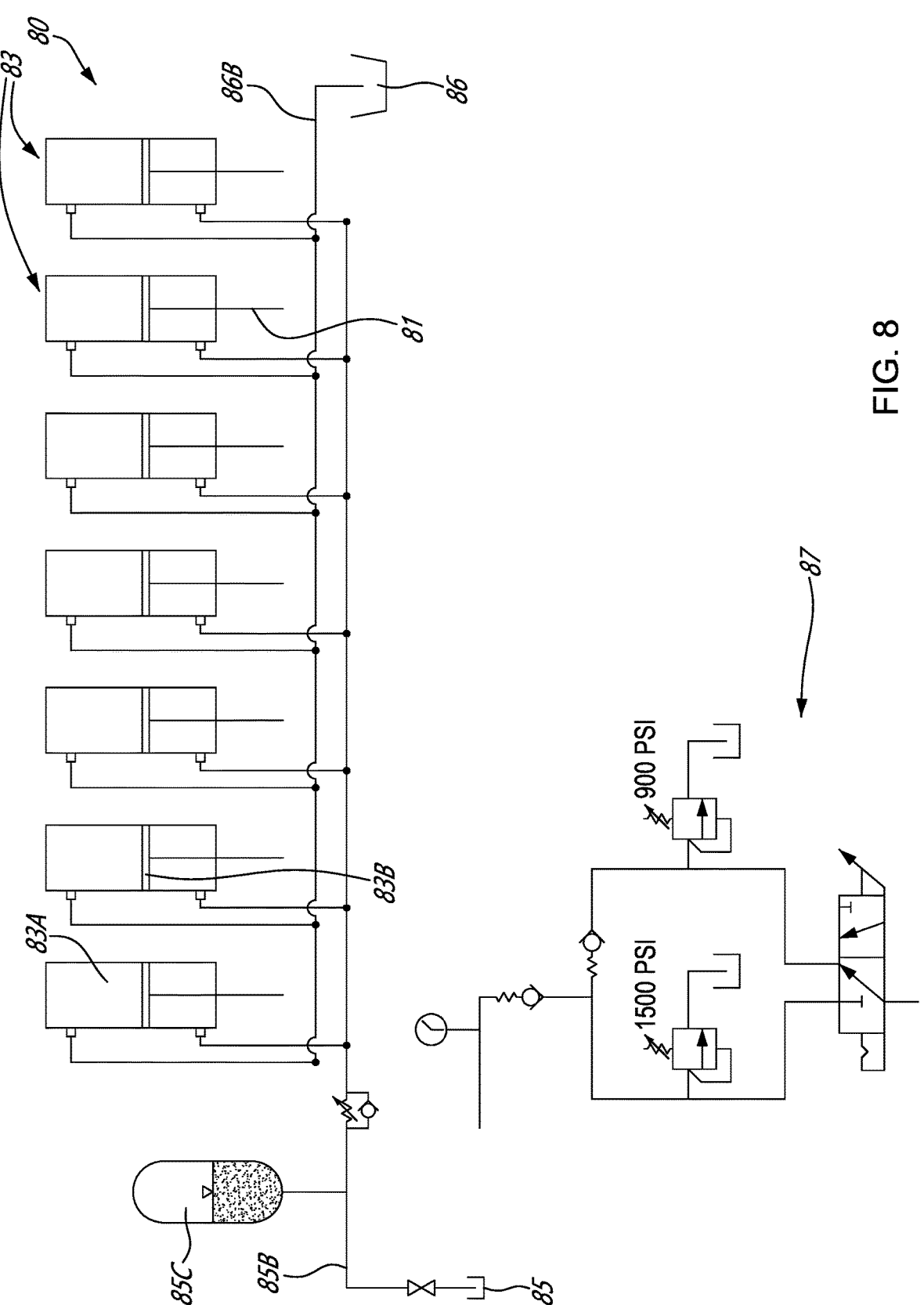
FIG. 8 is another exemplary schematic view of the lifting mechanism of FIG. 6.

Referring to FIG. 8, another schematic of an exemplary lifting system 80 showing a plurality of mechanical cylinders 83, and an exemplary control system 87 therefore, is shown. As was the case with the lifting mechanism of FIG. 7, mechanical cylinders 83 are operatively coupled respective cables 81 and are fluidly coupled to a liquid source 85 and a gas source 86. In the shown case, the lifting system 80 further includes a liquid accumulator 85C (for instance an oil accumulator) for assisting in regulating the liquid pressure in the mechanical cylinders 83. In other cases, the liquid accumulator 85C may be omitted, with the liquid pressure being regulated through other means. In some cases, each harvester sleigh 20 may be raised or lowered individually. In other cases, the lifting system 80 may be configured to raise or lower each harvester sleigh 20 simultaneously.

FIG. 8 further shows an exemplary control system 87 for the lifting system 80, and more particularly for controlling the liquid (e.g., oil) pressure delivered to the mechanical cylinders 83. While shown as being disconnected, the control system 87 may be operatively and fluidly connected to the liquid source 85 and/or the accumulator 85C. An exemplary control system 87 using oil as a working fluid will now be described. In a first exemplary operating mode (referred to as a "lowering" mode), the control system 87 delivers little to no oil pressure to the mechanical cylinders 83, thereby allowing the pistons 83B to descend in the tubes 83A, which correspondingly allows the cables 81 to lower the harvester sleighs 20 from their stowed configurations to their lowered or usable configurations. In a second exemplary operating mode (referred to as a "levitating" or "operational" mode), the control system 87 delivers, for example, about 900 PSI of oil pressure to the mechanical cylinders 83, which translated to about 300 pounds of lifting force onto each harvester sleigh 20. As each harvester sleigh 20 may weigh approximately 325 pounds, a majority of the weight of each harvester sleigh 20 is supported by the cable 81, and the chain 34 is therefore mostly charged with towing the weight of the harvester persons 42 on board each harvester sleigh 20. Other lifting force weights and harvester sleigh 20 weights may be contemplated. In a third exemplary operating mode (referred to as a "lifting mode"), the control system 87 delivers, for example, about 1500 PSI of oil pressure to the mechanical cylinders 83, which provides a greater vertical lifting force against the cable 81 than the weight of the harvester sleigh 20, thereby allowing the harvester sleighs to vertically displace to their stowed configuration, for instance for transport (see FIGS. 4A-4B). In the "levitating" configuration, the pressure in each mechanical cylinder 83 may be kept constant regardless of the position of the piston 83B (for instance, if a harvester sleigh 20 rises or drops vertically due to uneven terrain), as they are all fluidly connected via liquid conduits Such uniformity in tension in the mechanical cylinders 83 may allow the lifting system 80 to accommodate for terrain variations and allowing the harvester sleighs 20 to move independently of each other.

Figure 9:
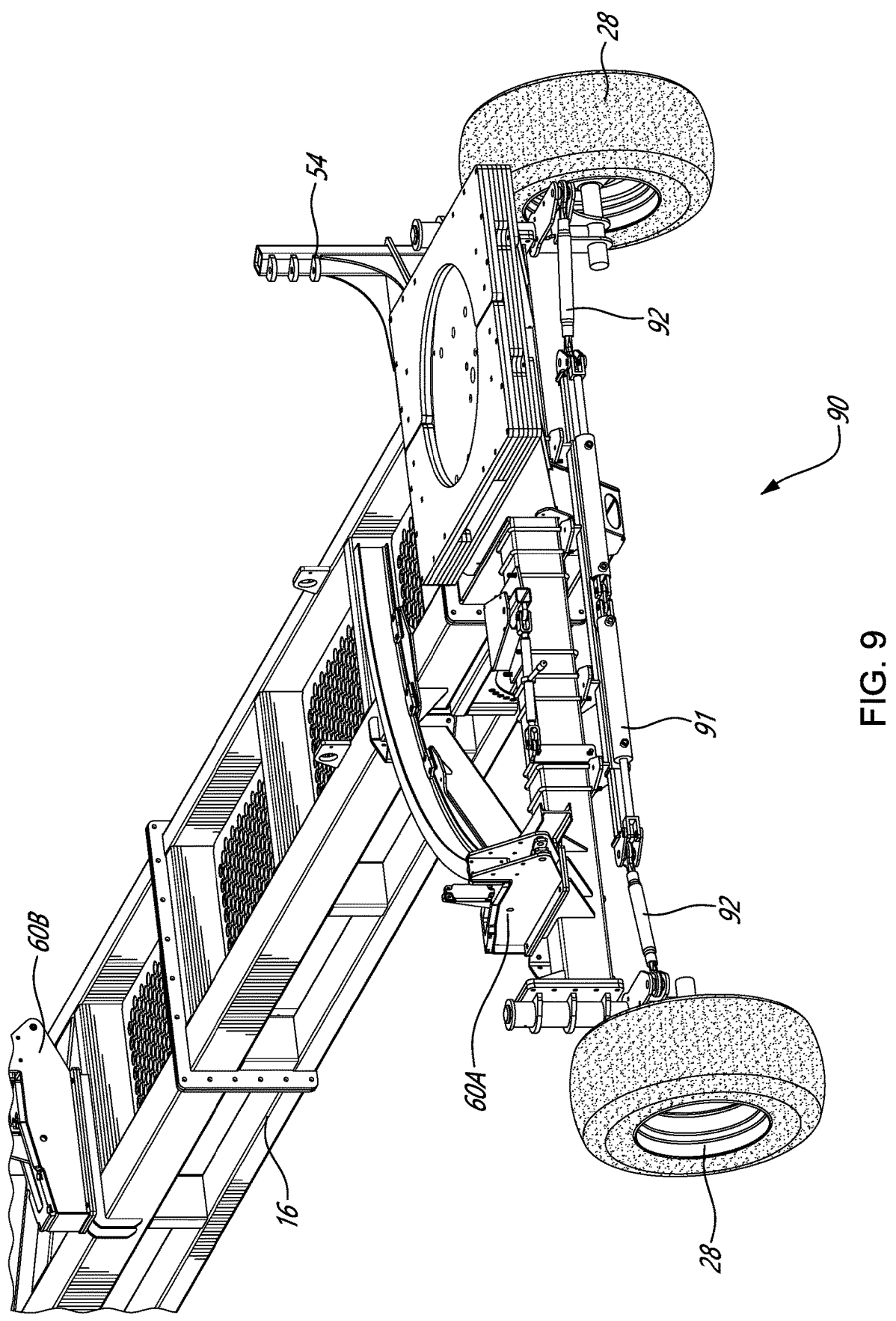
FIG. 9 is a rear perspective view of a trailer frame of the mobile harvesting system of FIG. 1.

Referring to FIG. 9, in some cases, the mobile harvesting system 10 may include a steering system 90 for the wheels 28. For instance, an operator of the vehicle 12 may choose to orient the wheels 28 in a same direction of travel as the vehicle to ensure the mobile harvesting system 10 exits a field 14 in a desired directed. Similarly, the operator of the vehicle 12 may choose to orient the wheels 28 in an opposite direction of travel as the vehicle to reduce the turning radius of the mobile harvesting system 10, for instance for easier manoeuvering. In the shown case, the steering system 90 includes a rack and pinion unit 91 mounted to the trailer frame 16 and extending laterally between the wheels 28, with control arms 92 operatively connecting the rack and pinion unit 91 to each wheel 28. A control and linking member (not shown) may extend along a length of the trailer frame 16 allowing for the operator on the vehicle 12 to control the steering system 90, for instance with a lever or other like controller. Other motion transmission means of and between wheels 28 may be contemplated.

Figure 10:
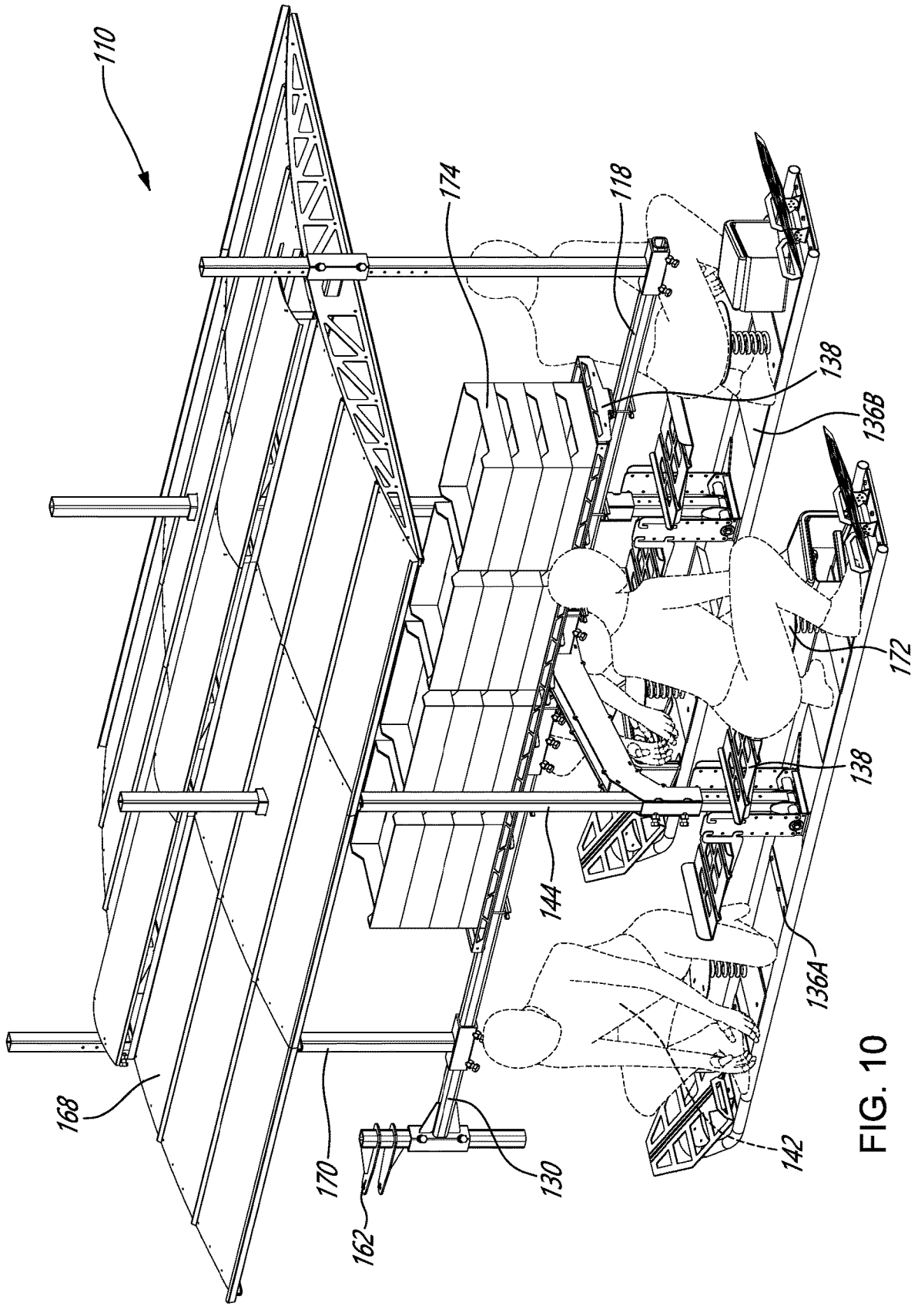
FIG. 10 is a perspective view of a mobile harvesting device in accordance with another embodiment of the present disclosure.

Referring to FIG. 10, in another embodiment, a mobile harvesting device 110 is shown in accordance with another embodiment of the present disclosure. Unless otherwise specified, like reference numerals refer to like elements, though in the 100's (i.e., +100). For example, the roof 68 in the mobile harvesting system 10 is analogous to the roof 168 in the mobile harvesting device 110.

Mobile harvesting device 110 is towable longitudinally by a vehicle (not shown) along a field (not shown) to be harvested, for instance a field of low bush crops. The depicted mobile harvesting device 110, which may also be referred to as a harvester sleigh, includes an elongate frame 118 with a tongue 130 and coupler 162 at a distal end thereof for coupling the mobile harvesting device 110 to the vehicle. In some cases, the tongue may be retractable within the elongate frame 118 for varying the overall length of the mobile harvesting device 110. The mobile harvesting device 110 includes a first runner 136A transversally spaced apart from a second runner 136B, the first and second runners 136A, 136B longitudinally oriented and interconnected to the frame 118 by upright supports 144. Harvesting persons 142 are supported by one of the first and second runners 136A, 136B, for instance on a seat 172. Various seats 172 may be provided, for instance extending upward from one of the runners 136A, 136B or extending outward from one of the upright supports 144. A harvesting rack 138 is supported by the frame 118 and illustrative supports a plurality of baskets 174 for collecting the harvested crops. Mobile harvesting device 110 may further include a roof 168 disposed above and supported by the frame 118, illustratively by both the upright supports 144 and roof support members 170 extending upwardly from the frame 18. In some cases, the roof 168 may be adjustable and/or removable, and may include one or more transparent panels. In other cases, the roof 168 may be omitted.

The mobile harvesting device 110 is therefore configured for being longitudinally towed, for instance by a vehicle, along a field, with the frame positioned above a row of crops and each of the first and second runners 136A, 136B sliding through the spacing between rows of crops so that harvesting persons 142 positioned on one or both of the first and second runners 136A, 136B can harvest the row of crops. The spacing between first and second runners 136A, 136B and the height of the frame 118 may therefore be set to correspond, respectively, with the width and height of a given row of crops. For instance, the height of the frame 118 relative to the first and second runners 136A, 136B may be adjustable, for instance by varying the position of the frame 118 along the upright supports 144.

According to the present disclosure, there is taught a method of harvesting a field of low bush crops, for instance field 14. A plurality of harvester persons 42 harvest corresponding, transversally spaced apart rows of low bush crops, for instance rows 22, while being supported by runners of at least one harvester sleigh, for instance runners 36 or 136 of sleigh 20 or device 110, the runners being longitudinally oriented and positioned in corresponding transversally interspaced spaces between the rows of low bush crops. Subsequently to the harvesting, a vehicle, for instance vehicle 12, is operated to pull the at least one harvester sleigh longitudinally while the plurality of harvester persons remain supported by the runners. Subsequently to operating the vehicle, the plurality of harvester persons harvest other rows of low bush crops.

As can be seen therefore, the examples described above and illustrated are intended to be exemplary only. The scope is indicated by the appended claims.

What is claimed is:

1. A mobile harvesting system, the mobile harvesting device towable longitudinally by a vehicle along a field, comprising:
   a trailer frame having wheels and a tongue configured for coupling to the vehicle;
   a harvesting frame being elongated and pivotally mounted to the trailer frame for pivoting between a longitudinal orientation and a transversal orientation, the harvesting frame having a plurality of sleigh attachments distributed along its length;
   a plurality of harvester sleighs, each harvester sleigh coupled to a corresponding one of the sleigh attachments at a corresponding transversal position relative to the trailer frame, each harvester sleigh having a first runner transversally spaced apart from a second runner, the first runner and the second runner both being longitudinally oriented and structurally interconnected by a sleigh frame; and
   a roof operatively coupled to and disposed above the harvesting frame, and a plurality of cables operatively coupling the plurality of harvester sleighs to the roof.

2. The mobile harvesting system as defined in claim 1, wherein the plurality of cables are operatively coupled to the roof via mechanical cylinder and pulley system configured for raising and lowering the plurality of harvester sleighs relative to the harvesting frame.

3. The mobile harvesting system as defined in claim 1, wherein each harvester sleigh is coupled to the harvesting frame via a mechanical cylinder configured for selectively varying a lateral position of each of the plurality of harvester sleighs relative to the harvesting frame.

4. The mobile harvesting system as defined in claim 1, wherein the harvesting frame is pivotally mounted to the trailer frame by one or more mechanical cylinders.

5. The mobile harvesting system as defined in claim 1, wherein the plurality of harvester sleighs each include one or more seats supported by one of the first runner and the second runner.

6. The mobile harvesting system has defined in claim 1, wherein the sleigh frame of each of the plurality of harvester sleighs supports a harvesting rack.

7. A method of harvesting a field of low bush crops, the method comprising:
   coupling a plurality of harvester sleighs to a trailer frame at corresponding transversal positions relative to the trailer frame, including coupling the plurality of harvester sleighs to a harvesting frame pivotally mounted to the trailer frame, the trailer frame disposed in a transversal orientation relative to the harvesting frame;
   installing a roof above each of the plurality of harvester sleighs;
   a plurality of harvester persons harvesting corresponding, transversally spaced apart rows of low bush crops, while being supported by runners of the plurality of harvester sleighs, the runners being longitudinally oriented and positioned in corresponding transversally interspaced spaces between the rows of low bush crops;

subsequently to said plurality of harvester persons harvesting, operating a vehicle to pull the trailer frame and the coupled plurality of harvester sleighs longitudinally while the plurality of harvester persons remain supported by the runners;

subsequently to said operating the vehicle, the plurality of harvester persons harvesting other rows of low bush crops; and subsequently to the plurality of harvester persons harvesting other rows of low bush crops, raising the plurality of harvester sleighs; via a plurality of cables operatively coupling the plurality of harvester sleighs to the roof, above the harvesting frame, and pivoting the harvesting frame between the transversal orientation and a longitudinal orientation.

8. The method as described in claim 7, wherein pivoting the harvesting frame between the transversal orientation and the longitudinal orientation includes engaging or more mechanical cylinders operatively coupling the harvesting frame and the trailer frame.

9. The method as described in claim 7, further comprising installing one or seats on the runners of the plurality of harvester sleighs for supporting one or more of the plurality of harvester persons.

10. The method as described in claim 7, wherein coupling the plurality of harvester sleighs to the harvesting frame comprises coupling each of the plurality of harvester sleighs to the harvesting frame via a mechanical cylinder configured for maintaining each of the plurality of harvester sleighs in a fixed lateral position relative to the harvesting frame.

11. A mobile harvesting device, the mobile harvesting device towable longitudinally by a vehicle along a field, comprising:

a frame extending longitudinally and having a coupler configured for coupling to the vehicle;

a first runner transversally spaced apart from a second runner, the first runner and the second runner both being longitudinally oriented and structurally interconnected to the frame;

a harvesting rack supported by the frame; and a roof operatively coupled to and disposed above the frame, and a plurality of cables operatively coupling the frame to the roof.

12. The mobile harvesting device as defined in claim 11, wherein the mobile harvesting device includes one or more seats supported by one of the first runner and the second runner.

13. The mobile harvesting device as defined in claim 11, wherein the roof is removably coupled to the frame.

14. The mobile harvesting device as defined in claim 11, wherein a height of the frame is adjustable relative to the first runner and the second runner.

\* \* \* \* \*